Nov. 30, 1926.  
H. TANAKA  
1,608,966

PLUMBING TRAP DEVICE

Filed Jan. 18, 1926

INVENTOR:
HISAMITSU TANAKA.
By Atty: Edward M. ...

Patented Nov. 30, 1926.

1,608,966

UNITED STATES PATENT OFFICE.

HISAMITSU TANAKA, OF LOS ANGELES, CALIFORNIA.

PLUMBING-TRAP DEVICE.

Application filed January 18, 1926. Serial No. 82,055.

The present invention relates to a combined trap and drainage device, presenting in a single fitting, the functions of a trap and a drain pipe, together with means for cleaning the same when desired.

The objects of this invention are to provide a simple, practical and inexpensive device of the class specified, to simplify the connections thereto, and to secure other novel and desirable results herein set forth.

The main object of the invention is to provide a trap of this character, adapted to be connected to a sink, bowl or other fixture, and trap all foreign articles that would tend to clog the drain pipes, and to provide means for removing the trapped articles without disconnecting the device.

Figure 1:
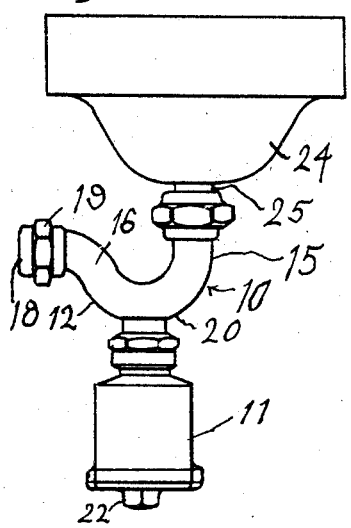
Figure 4:
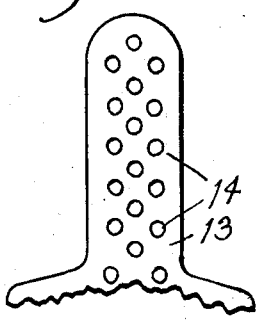
Figure 2:
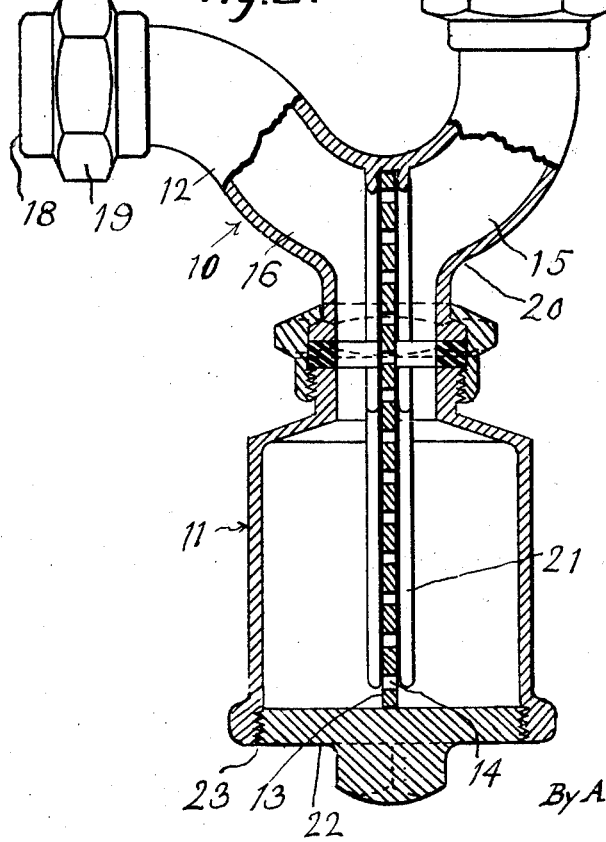
Figure 3:
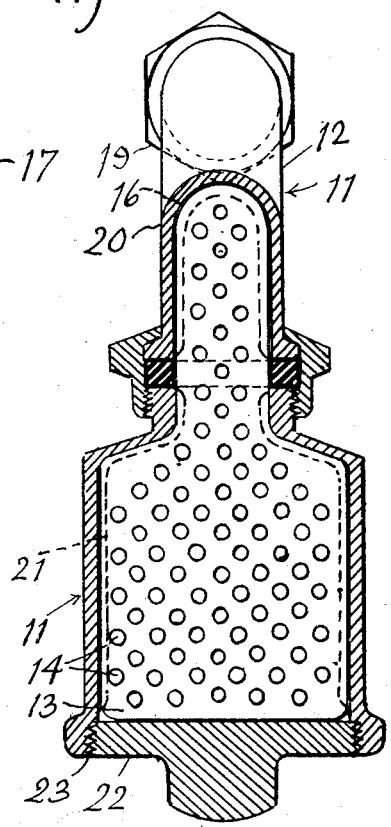

In the drawings, Figure 1 is a side elevation showing my improved device interposed between a sink and its drain pipe. Fig. 2 is a vertical and sectional view of the device. Fig. 3 is a sectional view of the device turned ninety degrees. Fig. 4 is a fragmentary and detail view of the baffle element.

My improved device consists of a trap member 10 and a casing 11, cylindrical in form, having a neck at the upper part thereof. Within the casing I provide a baffle member 13, this baffle member being provided with apertures 14 through which the water may pass from one compartment 15 to the opposite compartment 16. The compartment 15 is provided with elements 17, for connection to the drain pipe from the sink, bowl or other fixture. The compartment 16 is provided with an outlet 18, having elements 19, for connection to a drain pipe. The outlet 18 is above the level of the bottom 20, of the neck 12. Rib elements 21, projecting from the inner wall of the casing, serve to retain the baffle member 13 in operative position, and the cover 22, serves to retain the baffle member 13 in position between the retaining ribs 21.

When the cover 22 is removed, the baffle member 13, may be removed through the clean-out opening 23, provided. The sink or other fixture, indicated by numeral 24, is connected by its drainage pipe 25, to the inlet 26, which is provided with the connecting elements 17.

In use, the water flowing into one side or compartment, will strike the baffle 13, which will serve to obstruct the movement of any foreign articles not capable of passing through the apertures 14. Such foreign matter will accumulate in the first compartment, and, upon removing the cover 22, may be removed from the device. After thus flowing from one compartment to the other, the water, having the heavier foreign matter removed, will then pass into the drain pipe.

The arrangement further provides an active water seal, thus allowing the present device to be substituted for the ordinary trap fitting.

While the drawings exhibit an embodiment of the invention I have found to be desirable, it is to be understood that I reserve the privilege of resorting to all changes and modifications to which the device is susceptible, the invention being defined and limited only by the scope of the appended claims.

What is claimed is:

1. In a trap fixture, a tubular body curved to form a trap and having at its extremities an inlet opening and an outlet opening, both openings being in a plane higher than the central portion of the tubular body, a side outlet on the bottom of the tubular body, a cylindrical casing having a screw connection with the said outlet, elements for securing the tubular body to and in a line of drain pipe, a cover having a screw connection with the cylindrical casing and positioned at the bottom thereof, a perforated baffle member disposed in the cylindrical casing and having an upper portion extending in the tubular body, said baffle member extending in a plane transversely of a plane passing through the said inlet and outlet openings, and ribs within the tubular body and the cylindrical casing and determining the position of the baffle member.

2. A trap fitting comprising a tubular and curved body having a bottom outlet opening and inlet and outlet openings above the central portion of the tubular body, means for connecting the tubular body to a line of drain pipe, a cylindrical casing having a screw connection with the bottom outlet, a cover having a screw connection with the cylindrical casing at the bottom thereof, a baffle member having a series of perforations mounted transversely in the cylindrical casing and tubular body, and means for retaining the baffle member in its operative position.

3. A trap fitting comprising a body, having a curved and tubular form, means for connecting the body to a line of drain pipe, including inlet and outlet openings at each end of said tubular body and connecting elements adjacent to said openings, said inlet and outlet openings being above the main portion of the tubular body to thereby form a trap, an outlet at the bottom of the main portion of the tubular body and between the said inlet and outlet openings, a cylindrical casing detachably secured to said central outlet, a baffle member having a series of apertures, interposed within the cylindrical casing and extending upwardly into the tubular body, and disposed transversely in the cylindrical casing and transversely in the tubular body, said baffle member dividing the interior of both casing and tubular body into two compartments, the inlet opening communicating with one compartment and the outlet opening communicating with the other compartment, and ribs projecting within the interior of the casing and the interior of the tubular member to determine the position of the baffle member.

4. In a trap fitting, a curved and tubular body, openings at each end thereof and above the main portion of the tubular body, whereby a trap chamber is formed by the body, a cylindrical and detachable casing secured to the body at the bottom portion thereof, a perforated baffle member disposed in the casing and body and extending transversely therein, and means for determining the position of the baffle member, and a cover to retain the baffle member in position, having a screw connection with the cylindrical casing.

5. The combination with a tubular body adapted to be connected in a line of drain pipe and arranged to form a trap chamber, of a detachable cylindrical casing secured to the bottom of the trap chamber and depending therefrom, a perforated baffle member mounted in the casing and having its upper extremity projecting into the tubular body and serving to divide the exterior of the casing and body into two compartments, and means for determining the position of the baffle member, and a cover to maintain the baffle member relative to the said determining means.

In testimony whereof, I have hereunto affixed my signature.

HISAMITSU TANAKA.